(12) United States Patent
Klapper

(10) Patent No.: US 11,140,928 B2
(45) Date of Patent: Oct. 12, 2021

(54) CONNECTION BETWEEN TWO INTELLIGENT PIECES OF CLOTHING

(71) Applicant: ADAPTIVE REGELSYSTEME GESELLSCHAFT M.B.H., Salzburg (AT)

(72) Inventor: Ulrich Klapper, Rankweil (AT)

(73) Assignee: ADAPTIVE REGELSYSTEME GESELLSCHAFT M.B.H, Salzburg (AT)

( * ) Notice: Subject to any disclaimer, the term of this patent is extended or adjusted under 35 U.S.C. 154(b) by 0 days.

(21) Appl. No.: 16/635,478

(22) PCT Filed: Jul. 25, 2018

(86) PCT No.: PCT/EP2018/070108
§ 371 (c)(1),
(2) Date: Jan. 30, 2020

(87) PCT Pub. No.: WO2019/025246
PCT Pub. Date: Feb. 7, 2019

(65) Prior Publication Data
US 2020/0367576 A1 Nov. 26, 2020

(30) Foreign Application Priority Data
Aug. 4, 2017 (AT) .............................. A 50653/2017

(51) Int. Cl.
  *A41D 1/00* (2018.01)
  *H04B 5/00* (2006.01)
  *H01F 38/14* (2006.01)

(52) U.S. Cl.
  CPC ........... *A41D 1/005* (2013.01); *H04B 5/0031* (2013.01); *H04B 5/0043* (2013.01); *H04B 5/0093* (2013.01); *H01F 38/14* (2013.01)

(58) Field of Classification Search
  CPC .. H04B 5/0031; H04B 5/0043; H04B 5/0093; H01F 38/14
  (Continued)

(56) References Cited

U.S. PATENT DOCUMENTS 1,691,472 A * 11/1928 Graham ................. A43B 7/025
  219/211
2,287,915 A * 6/1942 Taylor .................... H05B 3/342
  219/211

(Continued)

FOREIGN PATENT DOCUMENTS

| EP | 2020275 A3 | 7/2013 |
| WO | 2005055390 A1 | 6/2005 |
| WO | 2016082992 A1 | 6/2016 |

*Primary Examiner* — Peter G Leigh
(74) *Attorney, Agent, or Firm* — Dykema Gossett PLLC

(57) ABSTRACT

Various aspects of the present disclosure are directed to establishing a simple and secure connection between two intelligent pieces of clothing. A first connecting part is provided on a first intelligent piece of clothing and a second connecting part is provided on a second intelligent piece of clothing. The first connecting part and the second connecting part are magnetically connected in order to align and interconnect a first signal connecting part in the first connecting part with a second signal connecting part in the second connecting part for establishing a signal connection between first electronics of the first intelligent piece of clothing and second electronics of the second intelligent piece of clothing.

18 Claims, 3 Drawing Sheets

(58) Field of Classification Search
USPC .......................................................... 439/37
See application file for complete search history.

(56) References Cited

U.S. PATENT DOCUMENTS

| | | | | |
|---|---|---|---|---|
| 2,329,766 | A * | 9/1943 | Jacobsen | ................ H05B 3/342 219/211 |
| 3,729,613 | A * | 4/1973 | Deloire | .............. A41D 13/0051 219/211 |
| 4,404,460 | A * | 9/1983 | Kerr | .................. A41D 13/0051 2/69 |
| 4,876,724 | A * | 10/1989 | Suzuki | .................. H04R 5/023 381/385 |
| 6,014,773 | A * | 1/2000 | Banks | ................. A41D 13/008 2/227 |
| 6,324,053 | B1 * | 11/2001 | Kamijo | .................. G06F 1/163 2/264 |
| 6,563,424 | B1 * | 5/2003 | Kaario | ................... G06F 1/163 340/572.1 |
| 7,076,206 | B2 * | 7/2006 | Elferich | .................. H02J 7/025 455/41.1 |
| 7,559,768 | B2 * | 7/2009 | Marmaropoulos | .. G09B 23/183 439/37 |
| 7,872,557 | B2 * | 1/2011 | Seibert | ................... H01F 38/14 336/117 |
| 8,188,868 | B2 | 5/2012 | Case, Jr. | |
| 8,308,489 | B2 * | 11/2012 | Lee | ................... H01R 13/2407 439/37 |
| 2007/0250981 | A1 | 11/2007 | Seibert | |
| 2016/0303426 | A1 | 10/2016 | Martikka et al. | |
| 2017/0070078 | A1 * | 3/2017 | Hwang | .................... H02J 7/34 |

* cited by examiner

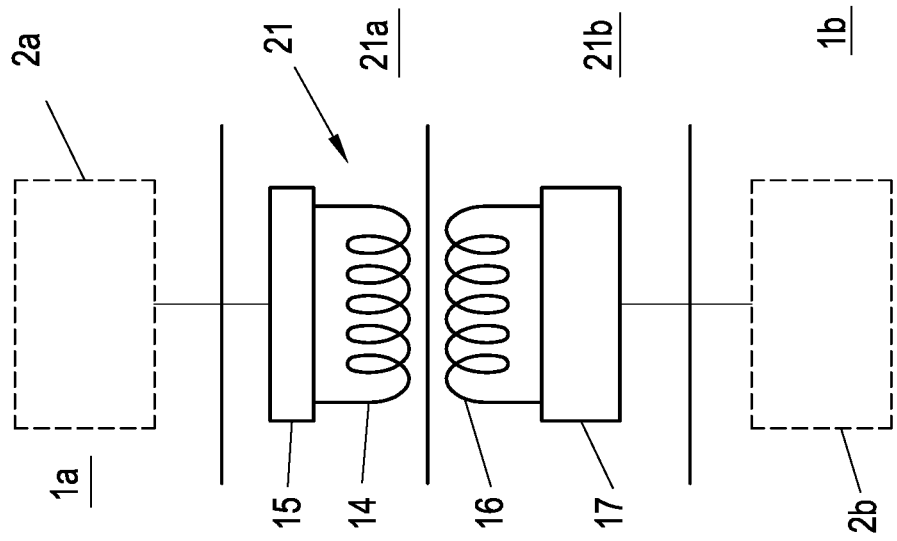
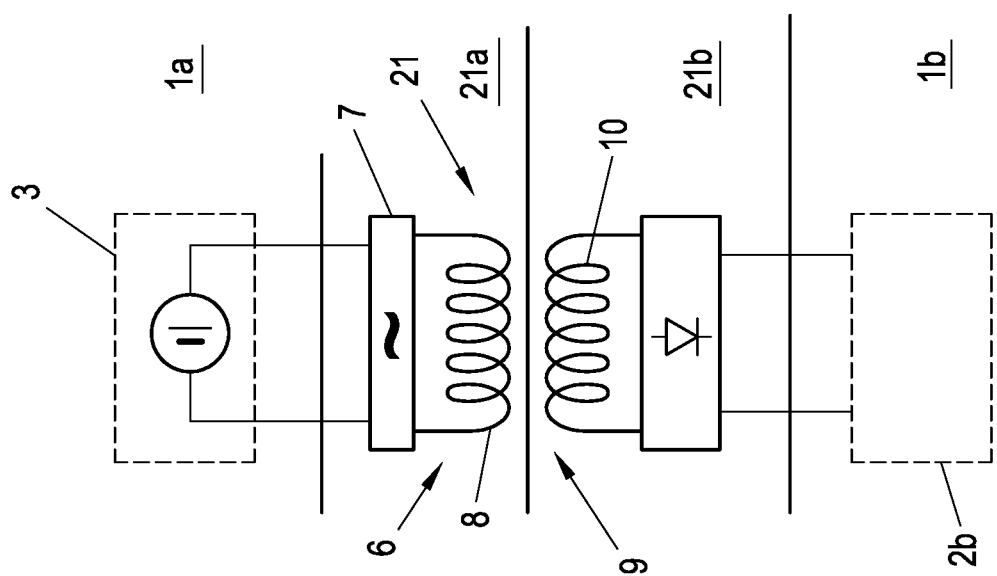
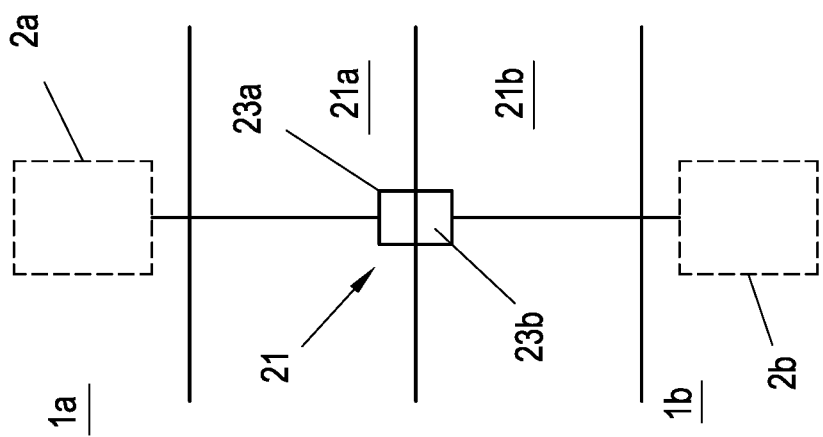

CONNECTION BETWEEN TWO INTELLIGENT PIECES OF CLOTHING

CROSS-REFERENCE TO RELATED APPLICATIONS

This application is a national stage filing based upon International PCT Application No. PCT/EP2018/070108, filed 25 Jul. 2018, which claims the benefit of priority to Austria application No. A 50653/2017, filed 4 Aug. 2017.

BACKGROUND

The present invention relates to a connection between a first intelligent piece of clothing having integrated first electronics and a second intelligent piece of clothing having integrated second electronics, and to the use of the connection in a workwear for people who carry out work on live parts, said workwear consisting of two parts and being connected to the connection.

Clothing with integrated electronics or electrics that are usually invisible from the outside are referred to as intelligent clothing. Almost any function can be implemented with the electronics, such as glowing clothes, game functions (e.g. laser tagging), monitoring of vital parameters (e.g. heart rate, blood pressure, body temperature, respiratory rate, electrocardiogram (EKG), etc.), safety functions (e.g. to detect electrical voltages, etc.), communication, multimedia, etc. In some applications, it is necessary to interconnect two intelligent pieces of clothing, for example in order to implement a functionality distributed over a number of pieces of clothing. It is therefore necessary to electrically interconnect the intelligent pieces of clothes. This can be done either wirelessly and/or in a wired manner.

SUMMARY OF THE INVENTION

It is therefore an object of the present invention to provide a simple and secure connection between two intelligent pieces of clothing.

This object is achieved according to the invention in that a first connecting part is provided on a first intelligent piece of clothing and a second connecting part is provided on a second intelligent piece of clothing and the first connecting part and the second connecting part are magnetically connected for establishing the connection, in order to align and interconnect a first signal connecting part in the first connecting part with a second signal connecting part in the second connecting part for establishing a signal connection between the first electronics and the second electronics. The magnetic coupling automatically ensures the correct alignment and position of the two signal connecting parts in order to implement the required signal connection. Alignment of the two signal connecting parts takes place automatically, making the connection extremely easy to handle and fail-safe.

In a simple embodiment, the first signal connecting part and the second signal connecting part form an electrical contact, with which any signal connection (energy, data transmission, electrical signal) can be established in a simple manner.

As signal connection a contactless data transmission can be realized in a simple manner if a high-frequency coil is arranged in the first signal connecting part and in the second signal connecting part, which are aligned with one another by the magnetic connection for contactless data transmission.

As signal connection a contactless energy transmission or data transmission can be realized in a simple manner if a transmission coil is arranged in the first signal connecting part and a reception coil is arranged in the second signal connecting part, which are aligned with one another by the magnetic connection for inductive energy transmission. Such inductive energy transmission is easy and safe to implement.

At least one permanent magnet is preferably arranged in the first connecting part, which interacts with at least one magnetic coupling part in the second connecting part, or vice versa, as a result of which the magnetic coupling can be implemented particularly easily. It is advantageous if the magnetic coupling part is also designed as a permanent magnet, which enables strong magnetic coupling.

The at least one permanent magnet is very particularly advantageously integrated into a magnetic circuit in that the permanent magnet is connected with a yoke, on which the transmitting coil, or receiving coil, is arranged and the magnetic coupling part is designed as a core, on which the receiving coil, or the transmitting coil, is arranged. The inductive energy transmission can thus be strengthened and improved. The same applies analogously to the contactless data transmission by means of high-frequency coils.

BRIEF DESCRIPTION OF THE DRAWINGS

The present invention is described in greater detail below with reference to the FIGS. 1 to 4, which show exemplary, schematic and non-limiting advantageous embodiments of the invention. In the drawings:

FIGS. 3a, 3b 3c show advantageous embodiments of the signal connection established by the connection

DETAILED DESCRIPTION

Figure 1:
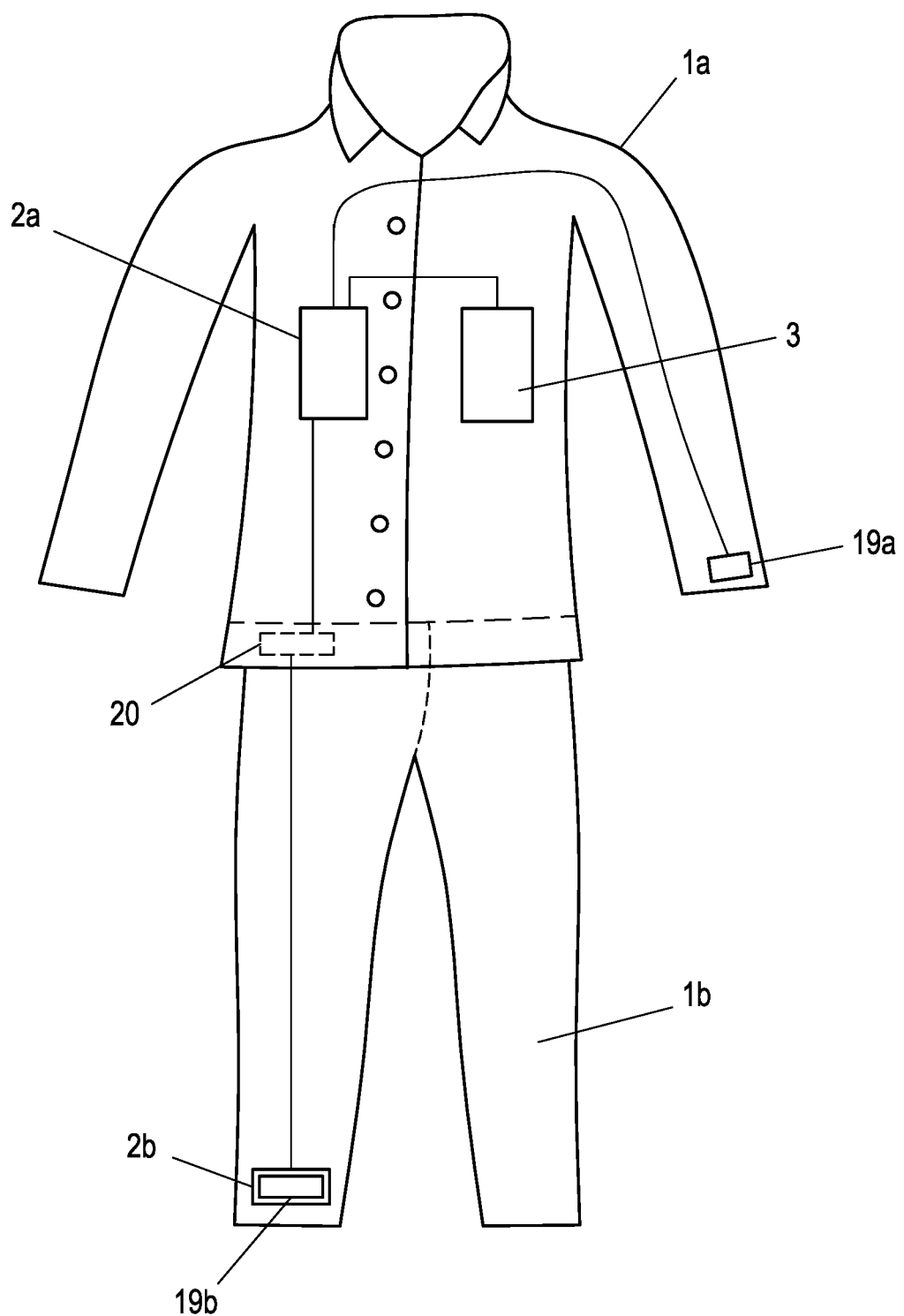
FIG. 1 shows two intelligent pieces of clothing that are interconnected by means of a connection according to the invention.

FIG. 1 shows a first intelligent piece of clothing 1a, for example a shirt, and a second intelligent piece of clothing 1b, for example a pair of pants. Electronics 2a are integrated in the first intelligent piece of clothing 1a and also include an electrode 19a on a cuff of the piece of clothing 1a, for example to measure an electrical voltage. Electronics 2b are integrated in the second intelligent piece of clothing 1b, for example in the form of an electrode 19b for voltage measurement. In order to be able to measure an electrical voltage between the electrode 19a of the electronics 2a and the electrode 19b of the electronics 2b, an electrical connection 20 must exist between the two electrodes 19a, 19b.

Such a voltage measurement is of course only a specific application in which two intelligent pieces of clothing 1a, 1b have to be interconnected. The connection 20 does not have to be electrical either, but could also be in the form of a data connection. Of course, depending on the application and functionality of the electronics 2a, 2b, the connection 20 can establish both an electrical connection 20 and a data connection. The connection 20 can also be either wireless or wired. The connection 20 can also serve to transfer electrical energy from one piece of clothing 1a to the other piece of clothing 1b if an energy storage 3, for example a Li-ion battery, a primary battery (button cell), etc., is only provided on one piece of clothing 1a for energy supply. The connection 20 according to the invention is described in detail below.

Figure 2:
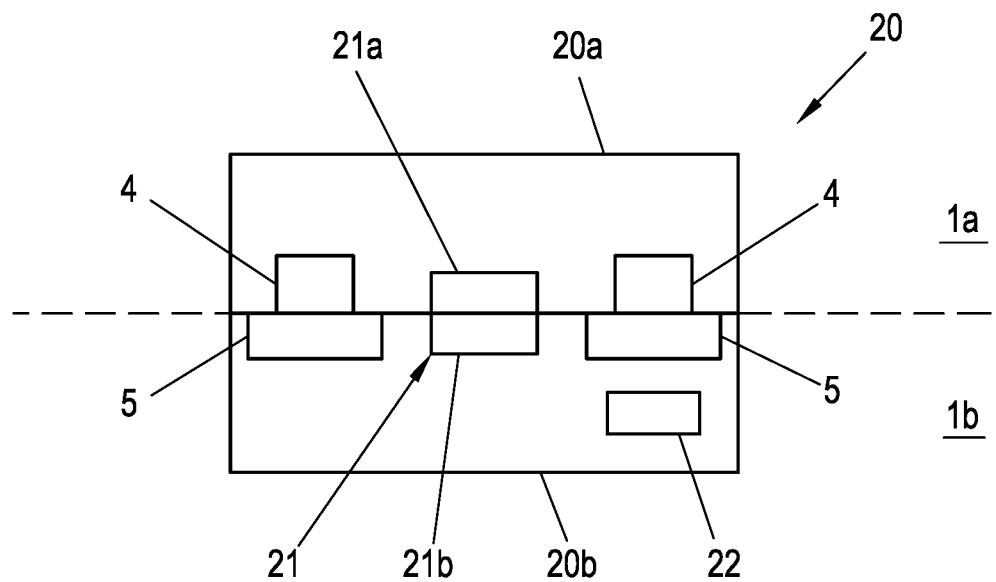
FIG. 2 shows the magnetic connection according to the invention.

A connection 20 according to the invention is shown schematically in FIG. 2 and consists of a first connecting part 20a and a second connecting part 20b, which together form the connection 20. The first connecting part 20a is arranged, for example, on the first intelligent piece of clothing 1a and the second connecting part 20b on the second intelligent piece of clothing 1b. The two connecting parts 20a, 20b are magnetically interconnected. For this purpose, at least one permanent magnet 4 is arranged on at least one connecting part 20a, which interacts with at least one magnetic coupling part 5 on the respective other connecting part 20b. The magnetic coupling part 5 is either a part made of a ferromagnetic material or also a permanent magnet arranged in the correct polarity. The two connecting parts 20a, 20b can thus only be magnetically connected in a defined relative position to one another, or the correct position is obtained automatically by the magnetic coupling. For this purpose, the at least one permanent magnet 4 and the magnetic coupling part 5 are of course arranged in such a way that they can basically interact to hold the connection 20 together magnetically.

In addition, a signal connecting part 21a, 21b is arranged in each of the two connecting parts 20a, 20b in order to establish via the connection 20 the required signal connection(s) 21, i.e. for example a data connection, an electrical connection or an energy transmission. Due to the magnetic coupling of the two connecting parts 20a, 20b, the two signal connecting parts 21a, 21b are simultaneously aligned and arranged in the correct position and orientation in order to produce the desired signal connection. The signal connection 21 thus takes place automatically through the magnetic coupling in the defined position. The connection 20 can thus be handled very easily since the user only has to establish the magnetic coupling and, moreover, does not have to worry about anything. Possible signal connections 21 are shown in FIG. 3.

A simple signal connection 21 is made by electrical contacts 23a, 23b, which are contacted by the magnetic connection of the two signal connecting parts 21a, 21b, as shown in FIG. 3a. Several electrical contacts can also be provided and closed. Such electrical contacts 23a, 23b can be used to transmit electrical signals, for example in the form of measured values such as voltages, but it can also be used to implement a data connection or energy transmission.

FIG. 3b shows a contactless energy transmission as signal connection 21. A first energy coupling part 6 of an inductive coupling for inductive energy transmission is arranged in the first signal connecting part 21a. In a simple embodiment, the first energy coupling part 6 comprises an inverter 7 (or oscillator) and an associated transmission coil 8, which emits an electromagnetic field. A second energy coupling part 9 is arranged in the second signal connecting part 21b. In a simple embodiment, the second energy coupling part 9 comprises a receiving coil 10 for receiving the electromagnetic field emitted by the transmitting coil 8 and a rectifier 11 connected to it. The rectifier 11 can be connected to the electronics 2b of an intelligent piece of clothing 1b. The rectifier 11 could of course also feed an energy buffer that supplies the electronics 2b. The inverter 7 and/or the rectifier 11 can of course also be part of the respective electronics 2a, 2b. Of course, it is fundamentally irrelevant from which piece of clothing the electrical energy is transmitted.

The magnetic connection between the two connecting parts 20a, 20b also ensures in particular that the first energy coupling part 6 (for example the transmitting coil 8) and the second energy coupling part 9 (for example the receiving coil 10) are arranged at the correct distance from one another and in the required relative position to one another, to enable contactless energy transfer. Due to the magnetic connection, the first connecting part 20a "snaps" onto the second connecting part 20b in the correct position and orientation.

In a further advantageous embodiment, contactless data transmission could also be provided as a signal connection 21, as shown in FIG. 3c. For contactless data transmission, high-frequency coils 14, 16 (typically in the frequency range between 10 kHz and 1 MHz), which interact for data transmission, could be provided in the first signal connecting part 21a and in the second signal connecting part 21b. For this purpose, one of the high-frequency coils 14, 16 sends an electromagnetic field for data transmission, which is detected by the other high-frequency coil 14, 16. The high-frequency coils 14, 16 are each connected to a communication unit 15, 17. For this purpose, the communication units 15, 17 can also be part of the respective electronics 2a, 2b. Data communication can take place according to any communication protocol.

The data transmission can be used in particular to exchange data or information between the two pieces of clothing 1a, 1b or their electronics 2a, 2b. For example, a status of the energy storage 3 (state of charge SoC or state of health SoH) could be queried or transmitted. However, such data can also be measurement data recorded with the electronics 2a, 2b on the piece of clothing 1a, 1b, for example EKG data, movement data, temperatures, electrical voltages between two points on the piece of clothing 1a, 1b. Such data can be stored in a storage unit of a piece of clothing 1a, 1b or also of the energy storage 3, for example in order to be read out later.

Figure 4:
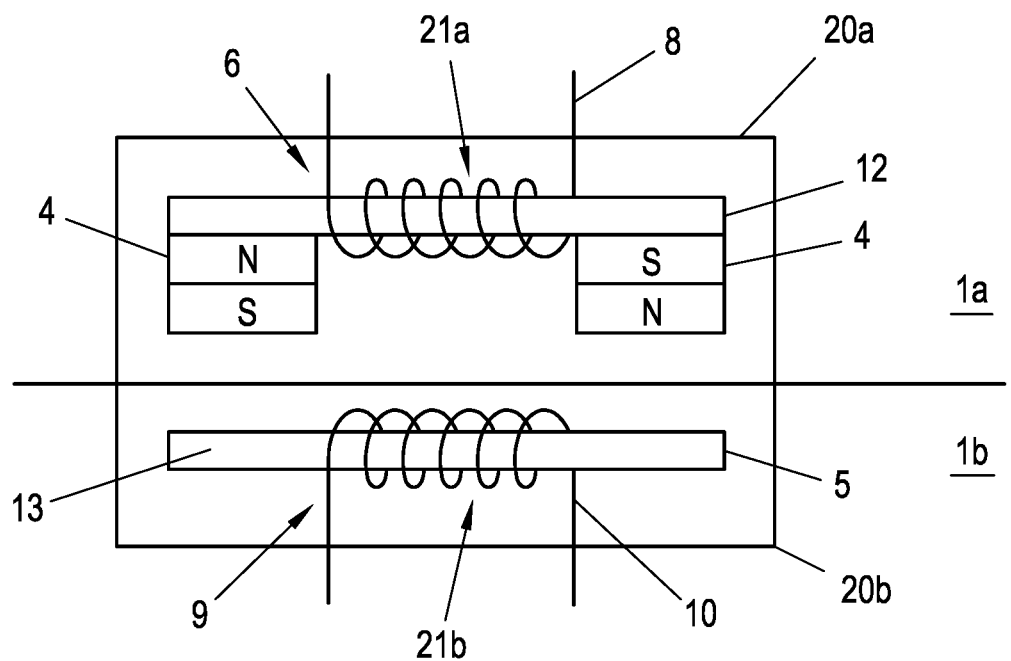
FIG. 4 shows the improvement of the contactless signal connection by the integration of the permanent magnet in a magnetic circuit.

In an advantageous embodiment of the invention according to FIG. 4, the magnetic connection between the two connecting parts 20a, 20b can also be used to improve the contactless energy transmission or data transmission. For this purpose, the at least one permanent magnet 4 is integrated into a magnetic circuit which extends between the first connecting part 20a and the second connecting part 20b. In an advantageous embodiment, for example, two permanent magnets 4 are provided in the first connecting part 20a, which are connected by a yoke 12 made of ferromagnetic material for closing the magnetic circle. The yoke 12 also serves as the core for the transmitting coil 8. A core 13, preferably made of ferromagnetic material, on which the receiving coil 10 is arranged is also arranged in the second connecting part 20b. The core 13 serves as a magnetic coupling part 5 and at the same time closes the magnetic circuit. The magnetic connection between the two connecting parts 20a, 20b not only aligns the transmitting coil 8 and the receiving coil 10 with one another, but at the same time closes the magnetic circuit. The at least one permanent magnet 4 in the magnetic circuit thus increases the magnetic flux flowing in the magnetic circuit, which improves the energy transmission from the transmitting coil 8 to the receiving coil 10. In the same way, the data transmission can also be improved if the high-frequency coils 14, 16 are arranged on the yoke 12 or on the core 13.

A particularly advantageous application of the connection 20 according to the invention is in workwear consisting of a first piece of clothing 1a and a second piece of clothing 1b (as shown in FIG. 1) for people who work on live parts. The electronics 2a, 2b in the two pieces of clothing 1a, 1b can thus be designed and functionally cooperate in such a way that an electrical voltage is detected between at least two points of the pieces of clothing, in particular between a first point on the first piece of clothing 1a, for example on the wrist, and a second point on the second piece of clothing 1b, for example on the ankle, as indicated in FIG. 1. The detected voltage can then be evaluated (by electronics 2a, 2b or externally) and a desired action can be triggered (by electronics 2a, 2b or externally). For a simple measurement of an electrical voltage via two pieces of clothing 1a, 1b and via the connection 20, a signal connection with an electrical contact 23 is advantageous, as shown in FIG. 3a.

For this purpose, electronics 2a, 2b can also comprise a transmission device, for example a radio transmitter, which, in the event of an excessively high voltage between the measured points, sends an emergency stop signal to an external switching unit in order to de-energize the live parts when the voltage exceeds the defined limit. A transmitting device of the energy storage 3 could also be used for this. In this way, possible injuries to the person wearing the workwear due to electric shock can be restricted, and fatal accidents can even be avoided entirely if this safety function is used correctly. It can also be provided that a signal device on a piece of clothing 1a, 1b (also as part of the electronics 2a, 2b) indicates whether the safety function is ready for operation, for example whether the connection 20 or the signal connection 21 has been established.

The correct connection could be determined, for example, with a reed contact 22 which is arranged in the connecting part 20b in which the magnetic coupling part 5 is arranged. The magnetic field of the permanent magnet 4 can thus be detected with the reed contact 22. If the magnetic connection between the two connecting parts 20a, 20b is established, the reed contact could be designed and arranged such that it closes by the magnetic field of the permanent magnet 4, with which the correct connection could be determined.

The invention claimed is:

1. A system of connecting intelligent pieces of clothing, the system comprising:
   a first intelligent piece of clothing including
     integrated first electronics, and
     a first connecting part having a first signal connecting part;
   a second intelligent piece of clothing including
     integrated second electronics connected to the first intelligent piece of clothing by means of a connection, and
     a second connecting part having a second signal connecting part, the second connecting part is configured and arranged to be magnetically connected to the first connecting part wherein the magnetic connection between the first and second connecting parts aligns and interconnects the first signal connecting part with the second signal connecting part thereby establishing a signal connection between the first electronics and second electronics.

2. The system of claim 1, wherein the first signal connecting part and the second signal connecting part form an electrical contact.

3. The system of claim 1, wherein the first signal connecting part and the second signal connecting part include high-frequency coils, which are arranged respectively, the high-frequency coils are configured and arranged to be aligned with one another by the magnetic connection and facilitates contactless data transmission between the integrated first and second electronics.

4. The system of claim 3, further including at least one permanent magnet integrated into a magnetic circuit via a yoke, on which a first high-frequency coil of the high-frequency coils is arranged, and a magnetic coupling part is a core on which another high-frequency coil of the high-frequency coils is arranged.

5. The system of claim 3, further including
   at least one permanent magnet integrated in a magnetic circuit via a yoke, on which the transmission coil, or the reception coil is arranged, and
   a magnetic coupling part configured and arranged as a core on which the reception coil, or the transmission coil, is arranged.

6. The system of claim 1, wherein the first signal connecting part further includes a transmission coil and the second signal connecting part further includes a reception coil, wherein the transmission coil and the reception coil are configured and arranged when aligned to facilitate inductive energy transmission or data transmission therebetween.

7. The system of claim 6, wherein the first connecting part further includes at least one permanent magnet, and the second connecting part further includes at least one magnetic coupling part, wherein the at least one permanent magnet and the at least one magnetic coupling part are configured and arranged to magnetically interact with one another.

8. The system of claim 7, wherein the at least one magnetic coupling part is a permanent magnet.

9. The system of claim 1, wherein the first connecting part further includes at least one permanent magnet, and the second connecting part further includes at least one magnetic coupling part, wherein the at least one permanent magnet and the at least one magnetic coupling part are configured and arranged to magnetically interact with one another.

10. The system of claim 9, wherein the at least one magnetic coupling part is a permanent magnet.

11. The system of claim 10, further including
    a magnetic circuit with the at least one permanent magnet integrated therein,
    a yoke integrating the magnetic circuit and the at least one permanent magnet by connection to the at least one permanent magnet,
    a high-frequency coil arranged on the yoke, and
    wherein the magnetic coupling part is a core on which the other high-frequency coil is arranged.

12. The system of claim 10, further including
    a magnetic circuit with the at least one permanent magnet integrated therein,
    a yoke integrating the magnetic circuit and the at least one permanent magnet by connection to the at least one permanent magnet;
    wherein the first signal connecting part further includes a transmission coil and the second signal connecting part further includes a reception coil, and the transmission coil and the reception coil are configured and arranged when aligned to facilitate inductive energy transmission or data transmission therebetween; the system further including
    a magnetic coupling part that is a core on which the reception coil, or the transmission coil, is arranged; and
    wherein the transmission coil, or the reception coil, is arranged on the yoke.

13. A method of monitoring electrical voltage across workwear including first and second intelligent pieces of clothing which are interconnected, the method comprising:

detecting an electrical voltage, via electronics within each of the first and second intelligent pieces of clothing, between a first point on the first piece of clothing and a second point on the second piece of clothing.

14. The method of claim 13 further including
de-energizing live parts being worked on by a user of the intelligent pieces of clothing in response to the electronics determining that a predetermined limit value for the detected electrical voltage is exceeded.

15. A method of establishing a connection between first and second intelligent pieces of clothing, the method comprising:
aligning a first connecting part of the first intelligent piece of clothing to a second connecting part of the second intelligent piece of clothing via a magnetic field induced between the first and second connecting parts, and whereby alignment of the first and second connecting parts also aligns a first signal connecting part of the first connecting part and a second signal connecting part of the second connecting part;
interconnecting the first intelligent piece of clothing with the second intelligent piece of clothing via the magnetic field induced between the first and second connecting parts; and
establishing a connection between the first signal connecting part of the first intelligent piece of clothing and the second signal connecting part of the second intelligent piece of clothing, and thereby establishing a signal connection between integrated first electronics within the first intelligent piece of clothing and integrated second electronics within the second intelligent piece of clothing.

16. The method of claim 15, further including
aligning high frequency coils of the first and second signal connecting parts in response to alignment of the first and second connecting parts in response to a magnetic field induced therebetween; and
conducting contactless data transmission between the integrated first and second electronics.

17. The method of claim 15, wherein the magnetic field induced between the first and second connecting parts is caused by at least one permanent magnet within the first connecting part and at least one magnetic coupling part within the second connecting part.

18. The method of claim 15, further including
conducting inductive energy transmission or data transmission between a transmission coil within the first signal connecting part and a reception coil within the second signal connecting part when aligned.

* * * * *